(12) United States Patent
Maziers

(10) Patent No.: US 9,255,161 B2
(45) Date of Patent: Feb. 9, 2016

(54) SOLID STATE PROPERTIES OF POLYETHYLENE PREPARED WITH TETRAHYDROINDENYL-BASED CATALYST SYSTEM

(71) Applicant: TOTAL RESEARCH & TECHNOLOGY FELUY, Seneffe (Feluy) (BE)

(72) Inventor: Eric Maziers, Seneffe (BE)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 14/327,700

(22) Filed: Jul. 10, 2014

(65) Prior Publication Data

US 2014/0349050 A1 Nov. 27, 2014

Related U.S. Application Data

(60) Continuation of application No. 12/876,523, filed on Sep. 7, 2010, now Pat. No. 8,822,611, which is a division of application No. 11/667,792, filed as application No. PCT/EP2005/056071 on Nov. 18, 2005, now abandoned.

(30) Foreign Application Priority Data

Nov. 19, 2004 (EP) .................................. 04105942

(51) Int. Cl.
| | |
|---|---|
| *C08F 210/16* | (2006.01) |
| *C08F 210/02* | (2006.01) |
| *C08F 4/6592* | (2006.01) |
| *C08F 4/76* | (2006.01) |
| *C08F 110/02* | (2006.01) |

(52) U.S. Cl.
CPC ............... *C08F 4/76* (2013.01); *C08F 4/65927* (2013.01); *C08F 110/02* (2013.01); *C08F 210/16* (2013.01); *Y10S 526/943* (2013.01); *Y10T 428/1379* (2015.01)

(58) Field of Classification Search
CPC ..... C08F 210/16; C08F 10/02; C08F 4/65927
See application file for complete search history.

(56) References Cited

U.S. PATENT DOCUMENTS

2005/0255264 A1* 11/2005 Maziers ....................... 428/35.7

OTHER PUBLICATIONS

J. S. Godinho, et al., "Prediction of mechanical properties of polyethylene mouldings based on laminate theory and thermomechanical indices" Plastics, Rubber and Composites, vol. 29, No. 7, pp. 329-339; 2000.

Annechini D. et al., "Some New Results on Rotational Molding of Metallocene Polyethylenes" Jan. 1, 2001; Society of Plastics Engineers. Annual Technical Conference (Antec). Proceedings, Society of Plastics Engineers, US—vol. 1, pp. 1-5.

* cited by examiner

*Primary Examiner* — Caixia Lu
(74) *Attorney, Agent, or Firm* — Albert Shung

(57) ABSTRACT

Rotomolded articles and methods of forming the same are described herein. The rotomolded articles generally have a permeability of less than 1 g/day. The rotomolded articles generally include polyethylene obtained by injecting into a reactor a catalyst system including a metallocene catalyst component of specific formula and an activating agent; injecting into the reactor ethylene monomer at a concentration of at least 6.5 wt %; injecting an amount of hydrogen such that a ratio of hydrogen to ethylene ($H_2/C_2$) in the feed is less than 85 $g/10^6$ g; maintaining the reactor under polymerization conditions at a temperature of less than 90° C.; and retrieving polyethylene exhibiting a melt index ($MI_2$) of at least 3.

4 Claims, 13 Drawing Sheets

R1: LX0210

100μm

R2: N307

100μm

R3: NG2432

100μm

R4: RM7402

100μm

R5: RG7403

100μm

R6

100μm

R7: Borealis RM 8403

100μm

R8: Dowlex 2431

100μm

R9

100μm

R10 : molding 210 °c

100μm

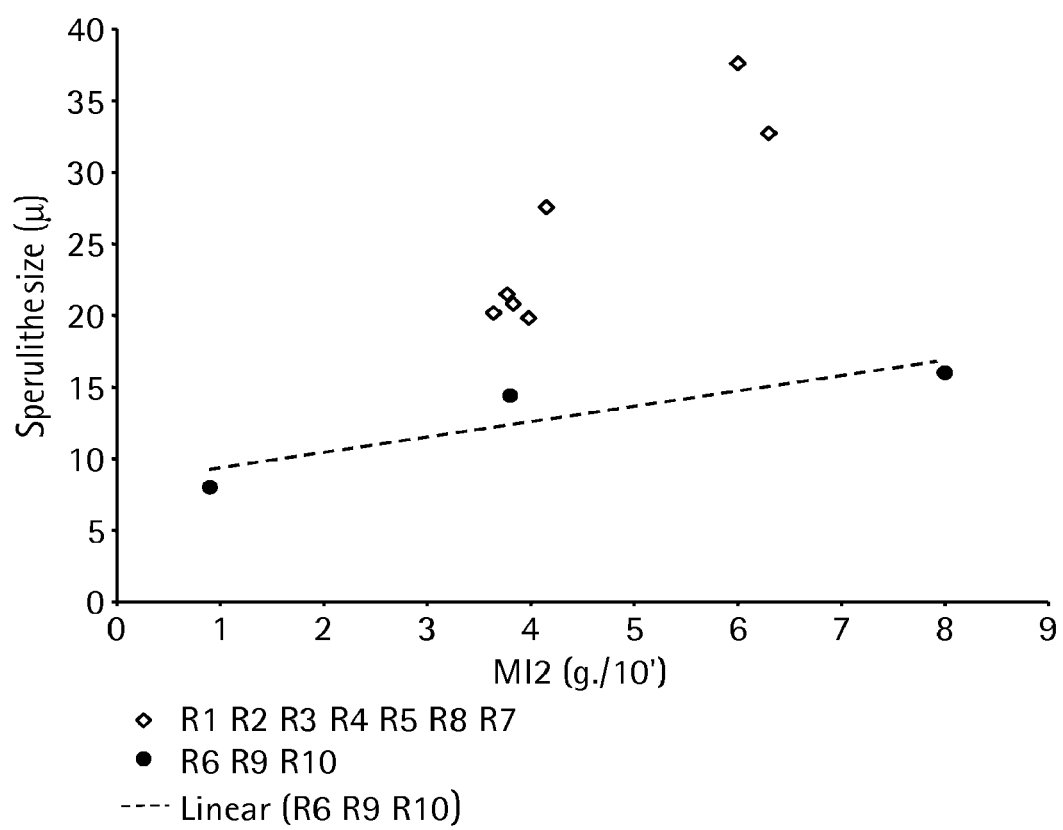

LOAD - DISPLACEMENT CURVE for R6 4.5mm-40°C

LOAD - DISPLACEMENT CURVE for R3 4.5mm-40°C

LOAD - DISPLACEMENT CURVE for R4 4.5mm-40°C

SOLID STATE PROPERTIES OF POLYETHYLENE PREPARED WITH TETRAHYDROINDENYL-BASED CATALYST SYSTEM

CROSS-REFERENCE TO RELATED APPLICATIONS

This application is a Continuation of U.S. application Ser. No. 12/876,523, filed on Sep. 7, 2010, which is a Divisional of U.S. application Ser. No. 11/667,792, filed on Jan. 15, 2008, now abandoned, which claims the benefit of PCT/EP2005/056071, filed on Nov. 18, 2005, which claims priority from EP 04105942.9, filed on Nov. 19, 2004.

This invention relates to the field of polyethylene prepared with a catalyst system based on a tetrahydroindenyl catalyst component and to their solid state properties.

Rotomoulding is used for the manufacture of simple to complex, hollow plastic products. It can be used to mould a variety of materials such as for example polyethylene, polypropylene, polycarbonate or polyvinyl chloride (PVC). Polyethylene (PE) represents more than 80% of the polymers used in the rotomoulding market. This is due to the outstanding resistance of polyethylene to thermal degradation during processing, to its easy grinding, good flowability, and low temperature impact properties.

Polyethylenes prepared with a Ziegler-Natta catalyst are generally used in rotomoulding, but metallocene-produced polyethylenes are desirable, because their narrow molecular weight distribution allows better impact properties and shorter cycle time in processing.

Most of the metallocene-prepared polyethylene resins available on the market (see ANTEC, vol. 1, 2001) are prepared with a catalyst system based on bis(n-butyl-cyclopentadienyl) zirconium dichloride. They suffer from poor dimensional stability such as high shrinkage and warpage. They also suffer from creep or permanent deformation under stress.

Godinho et al. (in Polymers, Rubbers and Composites, vol 29, n° 7, pp 316, 2000) have shown that for semi-crystalline polymers such as polyethylene small spherulite size equivalent to fine microstructure provides improved dimensional stability as well as other solid state properties such as for example improved impact strength.

It is an aim of the present invention to provide polyethylene resins having a fine microstructure that can be tailored according to needs.

It is also an aim of the present invention to provide polyethylene resins having reduced shrinkage.

It is another aim of the present invention to provide polyethylene resins having reduced warpage.

It is a further aim of the present invention to provide polyethylene resins having high creep resistance.

It is a yet further aim of the present invention to provide a polyethylene resin having high impact resistance.

It is yet another aim of the present invention to provide a polyethylene resin having high stress crack resistance.

It is also an aim of the present invention to provide a polyethylene resin having excellent barrier properties.

Accordingly, the present invention discloses a method for preparing a homopolymer or a copolymer of ethylene that comprises the steps of:

a) Injecting into the reactor a catalyst system comprising i) a metallocene catalyst component of general formula I $$R''(Ind)_2MQ_2 \quad (I)$$

wherein (Ind) is an indenyl or an hydrogenated indenyl, substituted or unsubstituted, R" is a structural bridge between the two indenyls to impart stereorigidity that comprises a $C_1$-$C_4$ alkylene radical, a dialkyl germanium or silicon or siloxane, or a alkyl phosphine or amine radical, which bridge is substituted or unsubstituted; Q is a hydrocarbyl radical having from 1 to 20 carbon atoms or a halogen, and M is a transition metal Group 4 of the Periodic Table or Vanadium, ii) an activating agent and iii) optionally a support;

b) injecting into the reactor ethylene monomer at a concentration of at least 6.5 wt %, c) injecting an amount of hydrogen such that the ratio $H_2/C_2$ in the feed is of less than 85 g/$10^6$ g;

d) maintaining under polymerisation conditions at a temperature of less than 90° C.;

e) retrieving polyethylene resin that is suitable for preparing articles having excellent solid state and barrier properties.

Each indenyl or hydrogenated indenyl compound may be substituted in the same way or differently from one another at one or more positions in the cyclopentadienyl ring, the cyclohexenyl ring and the bridge.

Each substituent on the indenyl may be independently chosen from those of formula $XR_v$ in which X is chosen from Group 14 of the Periodic Table, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

In a particularly preferred embodiment, both indenyls are unsubstituted, and most preferably they are unsubstituted hydrogenated indenyls.

The active catalyst system used for polymerising ethylene comprises the above-described catalyst component and a suitable activating agent having an ionising action.

Suitable activating agents are well known in the art.

Optionally, the catalyst component can be supported on a support.

The polymerisation conditions necessary to obtain the desired polyethylene resin comprise a high concentration of ethylene, little or no hydrogen and a low polymerisation temperature. The concentration of ethylene is of at least 6.5 wt %, preferably of at least 7 wt %. The amount of hydrogen is selected to give a $H_2/C_2$ in the feed of at most 85 g/$10^6$ g, preferably of at most 60 g/$10^6$ g, more preferably there is no hydrogen. The polymerisation temperature is of less than 90° C., preferably of less than 88° C., more preferably of from 80 to 85° C.

The PE resins prepared with the metallocene catalyst system of the present invention may be homo- or co-polymers of ethylene with densities ranging from 0.930 to 0.965 g/cc. The density is measured following the method of standard test ASTM 1505 at a temperature of 23° C. The melt index is typically of at least 0.5, preferably of at least 3, as measured following the method of standard test ASTM D 1238 under a load of 2.16 kg and at a temperature of 190° C. They are characterised by a narrow molecular weight distribution, typically with a polydispersity index (D) lower than 3. The polydispersity index is defined as the ratio Mw/Mn of the weight average molecular weight Mw to the number average molecular weight Mn. The long Chain Branching Index (LCBI) is superior to 0, indicating the presence of long chain branching. It is surprisingly observed that the long chain branching (LCB) initiates an auto-nucleation process. The magnitude of this nucleation process increases with increasing long chain branching and LCB itself can be tailored by modifying the polymerisation conditions. This auto-nucleation process suppresses or reduces the need for external nucleating agents for polyethylene resins.

These polyethylene resins can be used to prepare articles by all methods generally used in the field, such as for example rotomoulding, injection moulding, blow moulding or extrusion. They are particularly advantageous in rotomoulding applications.

The finished articles according to the present invention have several attractive properties.

They have a very fine microstructure characterised by an average spherulite diameter, smaller than those prepared either with Ziegler-Natta (ZN) resins or resins prepared with other metallocene catalyst systems. The copolymers of ethylene obtained according to the present invention have a typical spherulite size of less than 20 μm, preferably of less than 18 μm.

They have excellent properties in the solid state such as
  i) mechanical properties,
  ii) barrier properties,
  iii) dimensional stability.

The barrier properties of articles prepared with the resins according to the invention are of less than 1 g/day, preferably of less than 0.5 g/day.

These properties will be illustrated by way of examples.

LIST OF FIGURES

FIG. 8 represents the LCBI as a function of melt index MI2 expressed in dg/min.

Examples

Figure 1A:
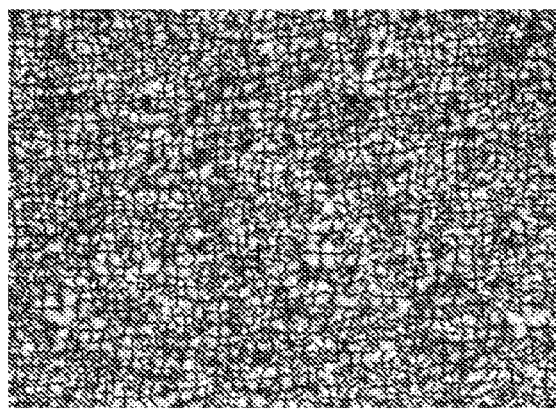
FIG. 1A to 1J represent the microstructure measured on 700 mL rotomoulded bottles prepared respectively with resins R1 to R10.
Figure 1B:
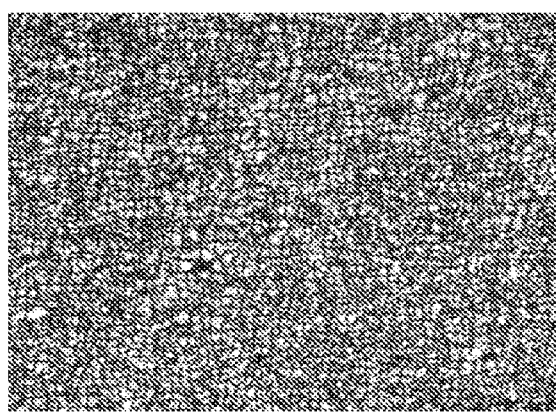
Figure 1C:
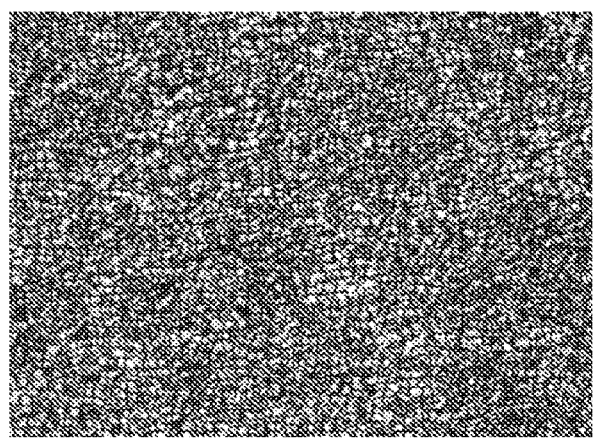
Figure 1D:
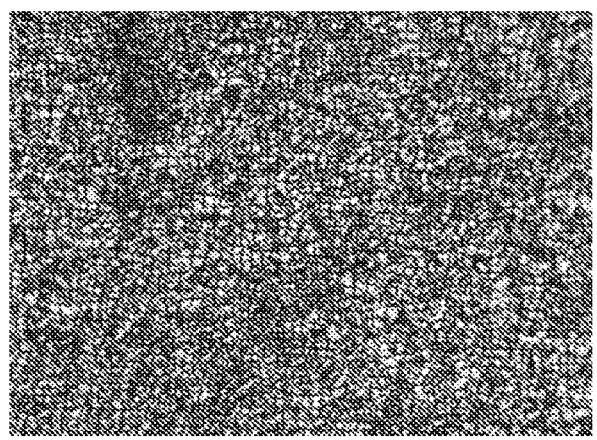
Figure 1E:
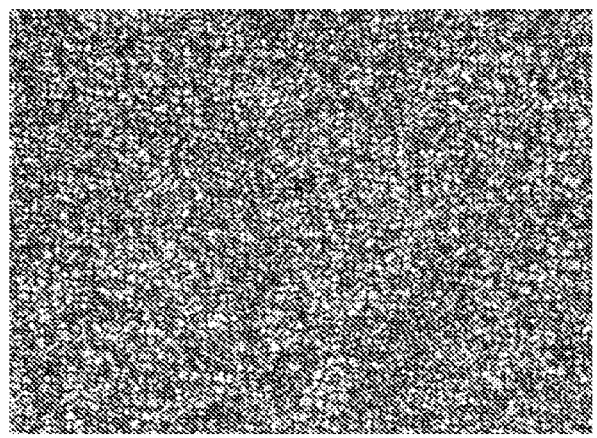
Figure 1F:
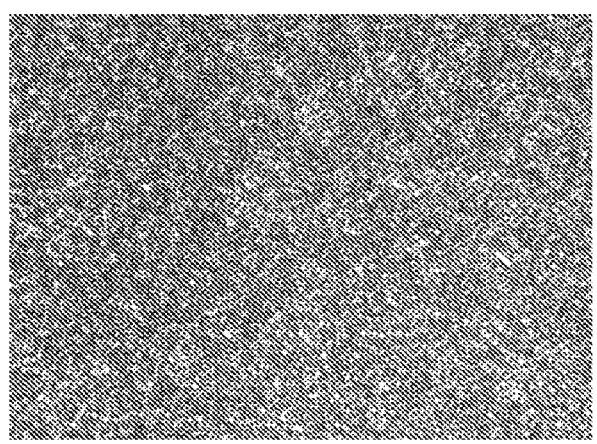
Figure 1G:
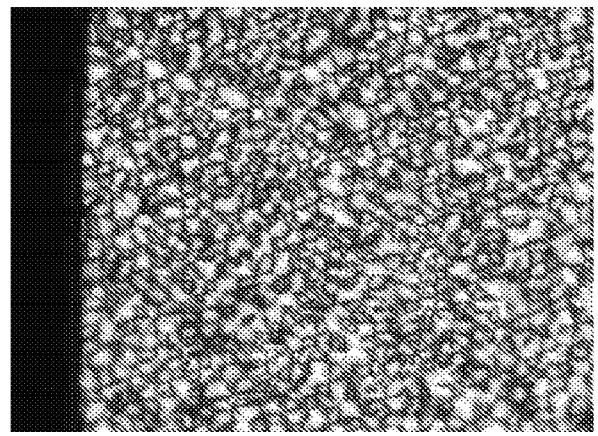
Figure 1H:
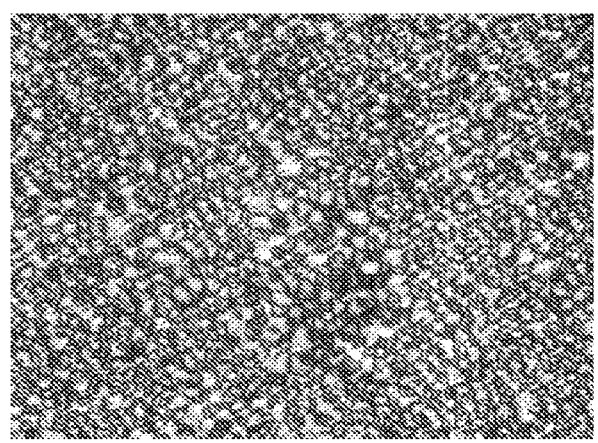
Figure 1I:
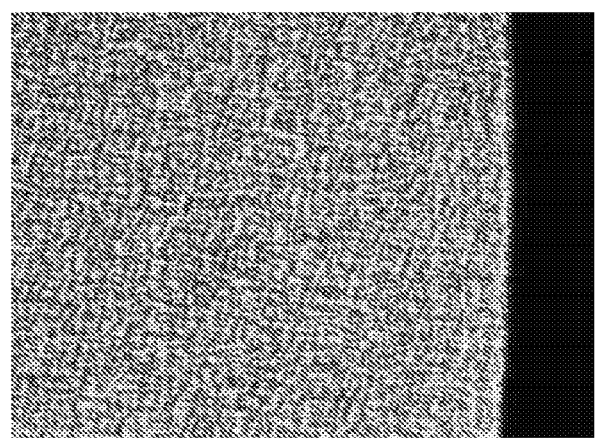
Figure 1J:

Several polyethylene resins have been used to prepare respectively
  700 mL rotomoulded bottles, using a proprietary mould;
  10 L rotomoulded bottles, using a proprietary mould;
  tanks;
  32 mm diameter tubes, using an proprietary mould; and
  moulded samples; and
  powder samples Resin R1 is a Ziegler-Natta (ZN) PE resin sold by Exxon Mobill Chemicals under the name LX0210.

Resin R2 is a ZN PE resin sold by Matrix under the name N307.

Resin R3 is a ZN PE resin sold by Dow Chemicals under the name NG2432.

Resin R4 is a metallocene-prepared PE resin sold by Borealis under the name RM7402. Resin R5 is a ZN PE resin sold by Borealis under the name RG7403.

Resin R6 is a resin according to the present invention prepared with a bridged bis(tetrahydroindenyl)-based catalyst system.

Resin R7 is a metallocene-prepared PE sold by Borealis under the name RM8403.

Resin R8 is a ZNPE resin sold by Dow Chemicals under the name NG2431.

Resin R9 is a resin according to the present invention prepared with a bridged bis(tetrahydroindenyl)-based catalyst system.

Resin R10 is a resin according to the present invention prepared with a bridged bis(tetrahydroindenyl)-based catalyst system.

Resin R11 is a homopolymer of ethylene according to the present invention prepared with a bridged bis(tetrahydroindenyl)-based catalyst system.

Their properties are summarised in Table I.

TABLE I

|  | MI2 Dg/min | Density g/cc | Tm ° C. | LCBI | Spherul. Size μm |
| --- | --- | --- | --- | --- | --- |
| R1 | 4.15 | 0.941 | 127.5 | 0 | 27.55 |
| R2 | 3.77 | 0.941 | 126.5 | 0 | 21.48 |
| R3 | 3.64 | 0.940 | 127 | 0 | 20.18 |
| R4 | 3.98 | 0.940 | 127.5 | 0 | 19.82 |
| R5 | 3.83 | 0.944 | 127.5 | 0 | 20.81 |
| R6 | 3.8 | 0.940 | 126 | 0.6 | 14.4 |
| R7 | 6 | 0.934 |  | 0 | 37.6 |
| R8 | 7 | 0.935 |  | 0 | 30.7 |
| R9 | 8 | 0.934 |  | 0.3 | 16 |
| R10 | 0.9 | 0.934 |  | 1.6 | 8 |
| R11 | 7.39 | 0.960 | 137 | 0.14 | 22* |

*It must be noted that the spherulite size increases with increasing density and that for the density of 0.960 g/cc of resin R11, the observed spherulite size is extremely small.

The melt flow index MI2 was measured following the method of standard test ASTM D 1238, under a load of 2.16 kg and at a temperature of 190° C. The density was measured following the method of standard test ASTM D 1505 at a temperature of 23° C.

The spherulite size is measured by Small Angle Light Scattering (SALS). When a beam of light passes through a thin slice of a semi-crystalline polymer, which is positioned between two crossed polarisers, the spherulites of the polymer diffuse the light and a four-leaf pattern is projected onto a screen positioned after the second polariser. The size of the pattern is inversely related to the spherulite diameter and may be used for its determination.

Rigidity analyses were carried out as follows.

The Young modulus was measured on compression-moulded samples following the method of standard test ASTM D 790 on samples R3 and R6 having an identical density. The Young modulus of resin R6 was higher than that of prior art resin R3 with values respectively of 575 MPa for resin R3 and of 615 Mpa for resin R6.

Rheological dynamic analysis in torsion mode was carried out on powder samples for resins R3 and R6, and in tensile mode for resins R1, R3, R4, R5 and R6. The elastic modulus E' (tensile mode) of resins according to the present invention had a higher value than that of all prior art resins over the whole range of tested temperatures.

Dynamic mechanical analysis measurements were carried out on 700 mL rotomoulded bottles prepared with a Peak Internal Air Temperature (PIAT) of 230° C. Compression tests were carried out to determine the force necessary to achieve for a 5 mm displacement and the maximum force for several resins. The resins according to the present invention outperformed all other resins.

Tensile analysis was carried out on rotomoulded tanks using the methods of standard test ISO R527/sample type 5, at a temperature of 23° C. and at a stretching speed of 100 mm/min. Resin R6 had a behaviour similar to or slightly better than that of the prior art resins for the yield stress, the Young's modulus and the elongation at break.

The resistance to impact was tested by the falling weight method on rotomoulded tanks and by the drop test on 10 L rotomoulded bottles having a 6 mm wall thickness.

The resins according to the present invention were all less brittle than the prior art resins.

The drop test was carried out at a temperature of −18° C., on 10 L rotomoulded bottles having a wall thickness of 6 mm and prepared with a proprietary mould. The bottles were dropped from increasing heights until failure occurred.

Prior art resin R1 failed at a height of 1.5 m.
Prior art resin R4 failed at a height of 2 m.
Prior art resin R5 failed at a height of 6 m.
Resin R6, according to the present invention did not fail up to a height of 6.5 m both at a temperature of −18° C. and at a temperature of −40° C.

All resins were also tested for stacking on 700 mL rotomoulded bottles, prepared with a proprietary mould, filled with a wetting agent (Huperol at 5% in water) and placed under a load of 35 kg. The height of the bottles was measured before loading and then at different time intervals after loading. The results are summarised in Table II.

The environmental stress crack resistance (bottle ESCR) tests were performed on 700 mL rotomoulded bottles having a 1.5 mm wall thickness, prepared with a proprietary mould and filled with an Antarox 10% solution. They were submitted to a force of 6 newtons per cm$^2$ at a temperature of 60° C. The resin according to the present invention outperformed all other resins as can be seen in Table III.

TABLE III

|  | Resin | | | | |
| --- | --- | --- | --- | --- | --- |
|  | R1 | R3 | R4 | R5 | R6 |
| ESCR (hr) | 26 | 40 | 48 | 19 | 54 |

Figure 4:
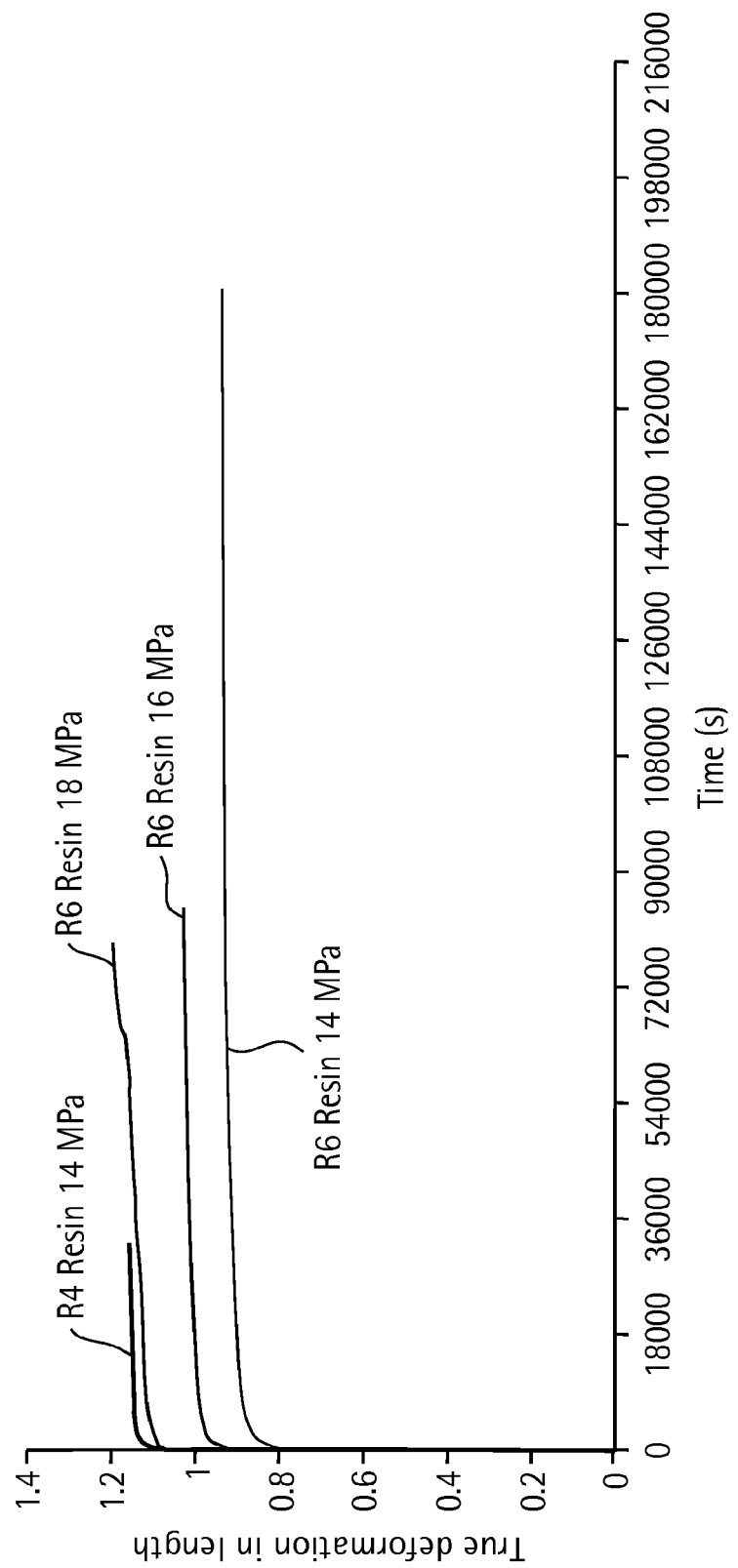
FIG. 4 represents the true longitudinal deformation expressed in mm as a function of time expressed in seconds in traction creep tests carried out at a temperature of 80° C. with applied stresses of 14 to 18 MPa on rotomoulded parts prepared respectively with resins R4 and R6.
Figure 5:
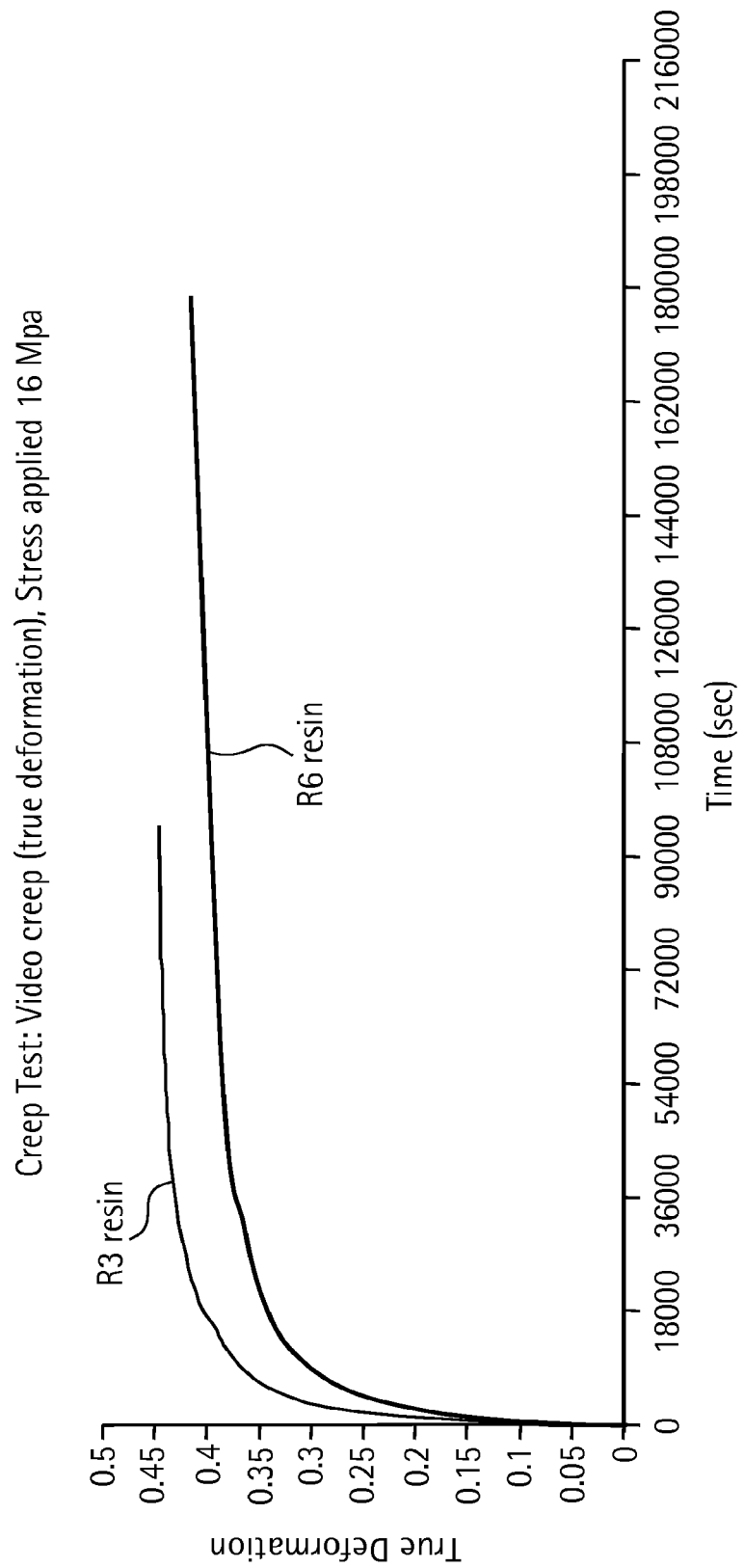
FIG. 5 represents the true longitudinal deformation expressed in mm as a function of time expressed in seconds in traction creep tests carried out at room temperature with an applied stress of 16 MPa on rotomoulded parts prepared respectively with resins R3 and R6.

Creep tests were also carried out. Results for the true longitudinal deformation as a function of time, for tubes submitted to a traction creep of 16 Mpa at room temperature are exhibited in FIG. 4 for resins R8 and R9 and in FIG. 5 for resins R3 and R6. They show the improved behaviour of resins R9 and R6 according to the present invention.

Pressure tests were carried out on rotomoulded pipes having a 32 mm diameter and a 3 mm wall thickness. They were submitted to a pressure of 3.5 Mpa at a temperature of 80° C. Prior art resin R3 failed after a period of time of 50 hours as compared to resin R6 according to the present invention that failed after a period of time of 400 hours.

Barrier properties were studied on rotomoulded 10 L bottles having a wall thickness of 6 mm and prepared with a proprietary mould. They were filled with fuel (CEC RF08-A-85 according to norm Standard ECE34—annex 5) at a temperature of 40° C. The results for the permeability to fuel, expressed in g/day, displayed in Table IV clearly show the outstanding barrier properties of resins R6 and R11.

TABLE II

| Resin | bottle weight (g) | bottle height (mm) | | | | | | |
| --- | --- | --- | --- | --- | --- | --- | --- | --- |
| | | t = 0 | t = 24 h | t = 72 h | t = 1 wk | t = 2 wk | t = 5 wk | t = 8 wk |
| R2 | 78.95 | 212 | 208 | 198.5 | broken | — | — | — |
| R3 | 79.2 | 212.25 | 209.75 | 204.25 | 203.25 | 201 | broken | — |
| R4 | 78.825 | 212 | 209 | 203.75 | 204 | 204 | broken | — |
| R5 | 78.55 | 212 | 208.5 | broken | — | — | — | — |
| R6 | 78.65 | 211 | 208.5 | 201.5 | 199.75 | 200 | 201 | broken |

In this table, the term "broken" means that, at least 50% of the tested samples, broke during the test.

From Table II it appears that the polyethylene resin of the present invention exhibits an excellent performance in the stacking test.

Figure 2:
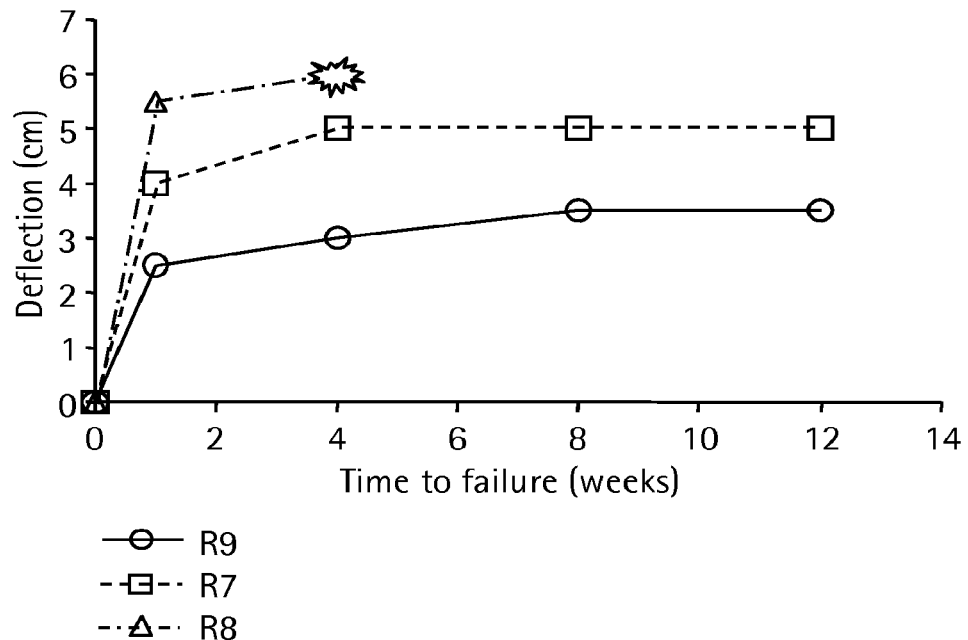
FIG. 2 represents the true deformation expressed in cm as a function of time expressed in weeks for resins R7, R8 and R9. In this figure, the star for resin R8 indicates breakage.

The stacking test performed at a temperature of 40° C. on 700 mL rotomoulded bottles having a 2.5 mm wall thickness, prepared with resins R7, R8 and R9 with a proprietary mould, filled with a wetting agent (Huperol at 5% in water) and placed under a load of 40 kg are displayed in FIG. 2 representing the deflection expressed in cm as a function of time expressed in days.

Figure 3:
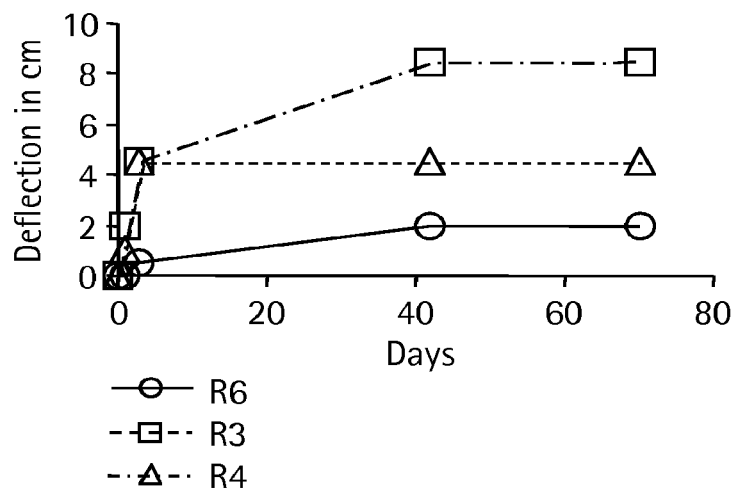
FIG. 3 represents the true deformation expressed in cm as a function of time expressed in weeks for resins R3, R4 and R6.

The stacking test performed at a temperature of 40° C. on 700 mL rotomoulded bottles having a 1.5 mm wall thickness, prepared with resins R3, R4 and R6 with a proprietary mould, filled with HNO$_3$ (55%) and placed under a load of 35 kg are displayed in FIG. 3 representing the deflection expressed in cm as a function of time expressed in days.

TABLE IV

| Resin | R2 | R3 | R4 | R5 | R6 | R11 |
| --- | --- | --- | --- | --- | --- | --- |
| Permeability (g/day) | 2.6 | 1.17 | 0.771 | 2.1 | 0.457 | 0.097 |

It can be seen that the resins according to the present invention clearly outperform all prior art resins with permeabilities of less than 0.5 g/day.

Figure 6:
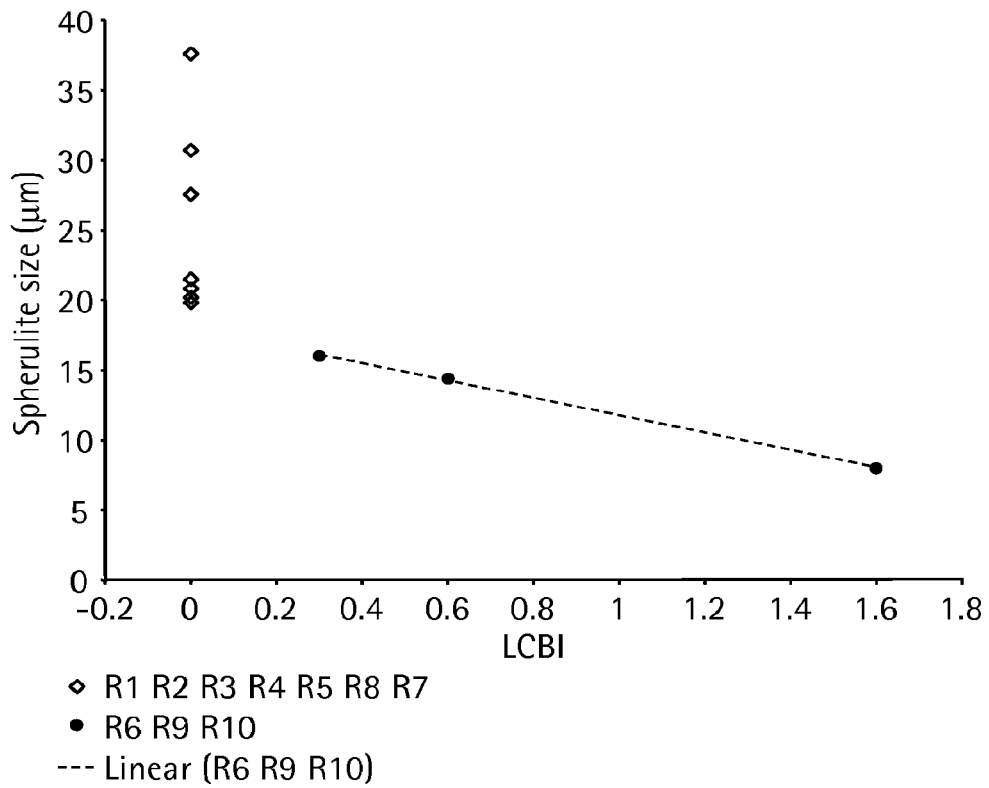
FIG. 6 represents the long branching index LCBI as a function of spherulite size expressed in μm.
Figure 7:
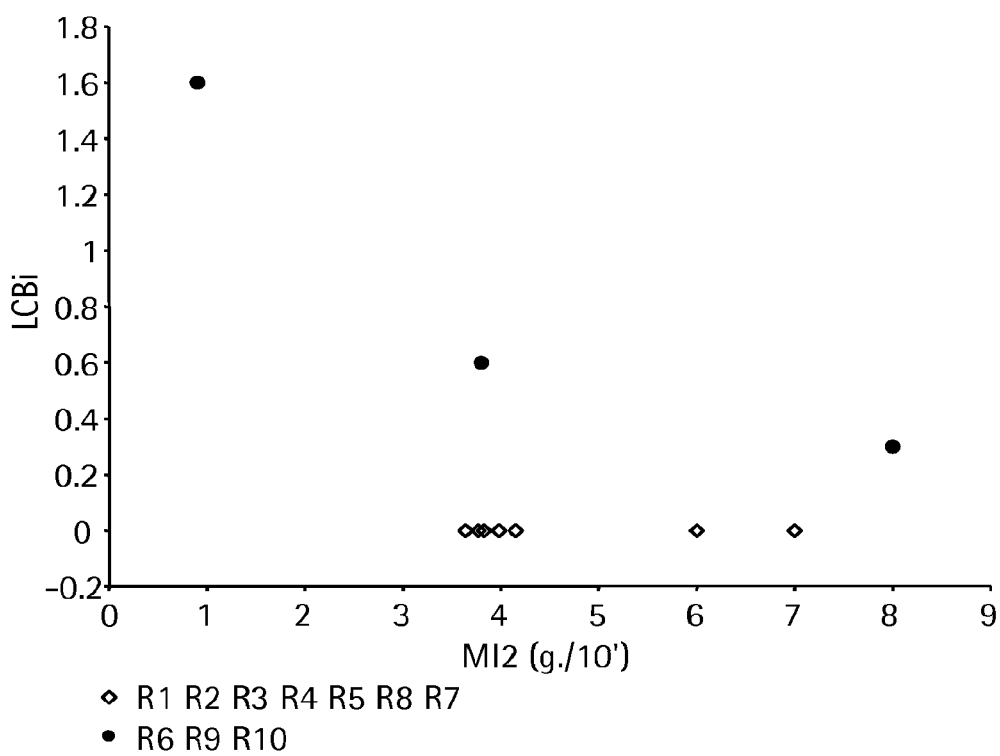
FIG. 7 represents the spherulite size expressed in μm as a function of melt index MI2 expressed in dg/min.

In addition, and quite contrary to prior art resins, clear correlations were observed between the long chain branching index LCBI, the spherulite size and the melt index. This behaviour is summarised respectively in FIGS. 6 to 8. FIG. 6 shows a linear correlation between the LCBI and the spherulite size. The spherulite size decreased linearly with increasing LCBI for resins R6, R9 and R10 whereas it remained unchanged for prior art resins. FIG. 7 shows a correlation between LCBI and melt index MI2 for the resins according to the present invention. The melt index increased with decreasing LCBI. In the resins of the present invention, the LCB content could thus be tailored by modifying the melt index. FIG. 8 shows a linear correlation between the melt index and the spherulite size. The melt index increased linearly with increasing spherulite size.

Impact tests were performed on rotomoulded articles prepared respectively with resin R6 according to the present invention and resins R3 and R4 usually employed in the field. The tests were performed following the method of standard test ISO 6603-2, respectively at temperatures of 20° C., −20° C. and −40° C. and on samples having a thickness of 4.5 and 6 mm. The results are displayed in Table V.

TABLE V

| Resin | Thickness (mm) | Temperature (° C.) | Peak Load (kN) | Peak Energy (J) | Total Energy (J) |
|---|---|---|---|---|---|
| R6 | 4.5 | 20 | 5.47 | 44.5 | 129.9 |
| R3 | | | 5.5 | 46.7 | 104.9 |
| R4 | | | 5.89 | 48.9 | 89.7 |
| R6 | 6.0 | | 8.6 | 102.5 | 252.8 |
| R3 | | | 6.62 | 55.9 | 118.6 |
| R4 | | | 8.81 | 90.1 | 279.5 |
| R6 | 4.5 | −20 | 7.32 | 63.2 | 188.6 |
| R3 | | | 4.43 | 16.8 | 25.7 |
| R4 | | | 5.94 | 31.8 | 74.0 |
| R6 | 6.0 | | 11.13 | 127.5 | 314.5 |
| R3 | | | 4.74 | 15.1 | 25.2 |
| R4 | | | 11.2 | 113.1 | 295 |
| R6 | 4.5 | −40 | 7.99 | 66.1 | 178.4 |
| R3 | | | 2.38 | 4.3 | 11.7 |
| R4 | | | 6.38 | 31.8 | 58.4 |
| R6 | 6.0 | | 12.11 | 125.2 | 334.3 |
| R3 | | | 4.04 | 7.7 | 14.8 |
| R4 | | | 10.46 | 92.4 | 235.5 |

Resin R6 according to the present invention outperforms the other resins at all tested temperatures.

Figure 9A:
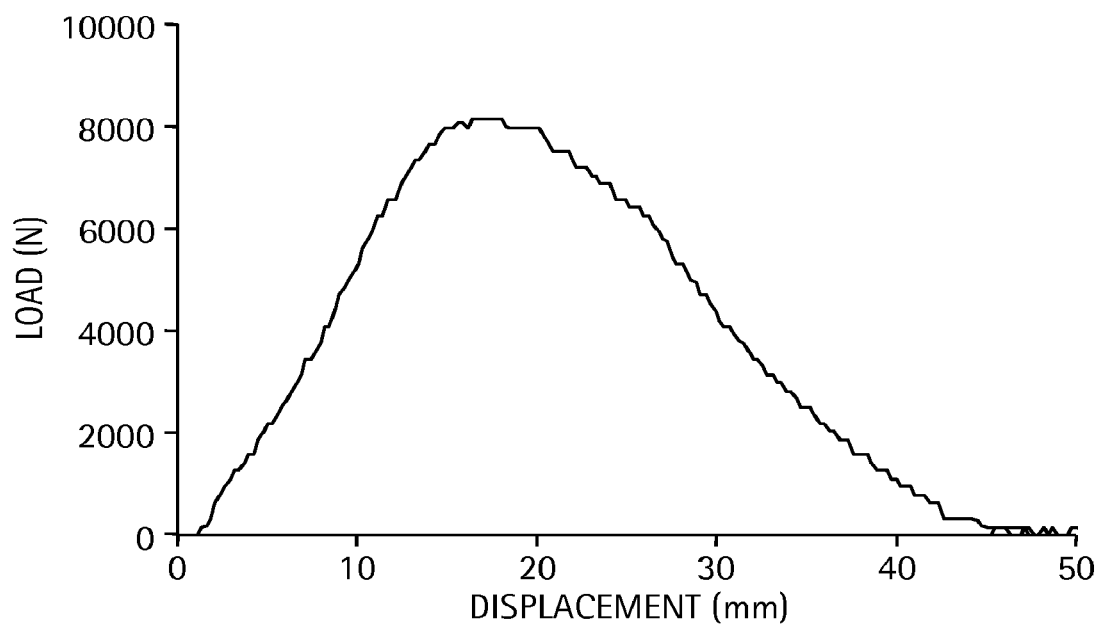
FIGS. 9a, 9b and 9c represent the load displacement curves at a temperature of −40° C. for 4.5 mm thick rotomoulded articles prepared respectively with resins R6, R3 and R4. The load is expressed in Newtons and the displacement in mm.
Figure 9B:
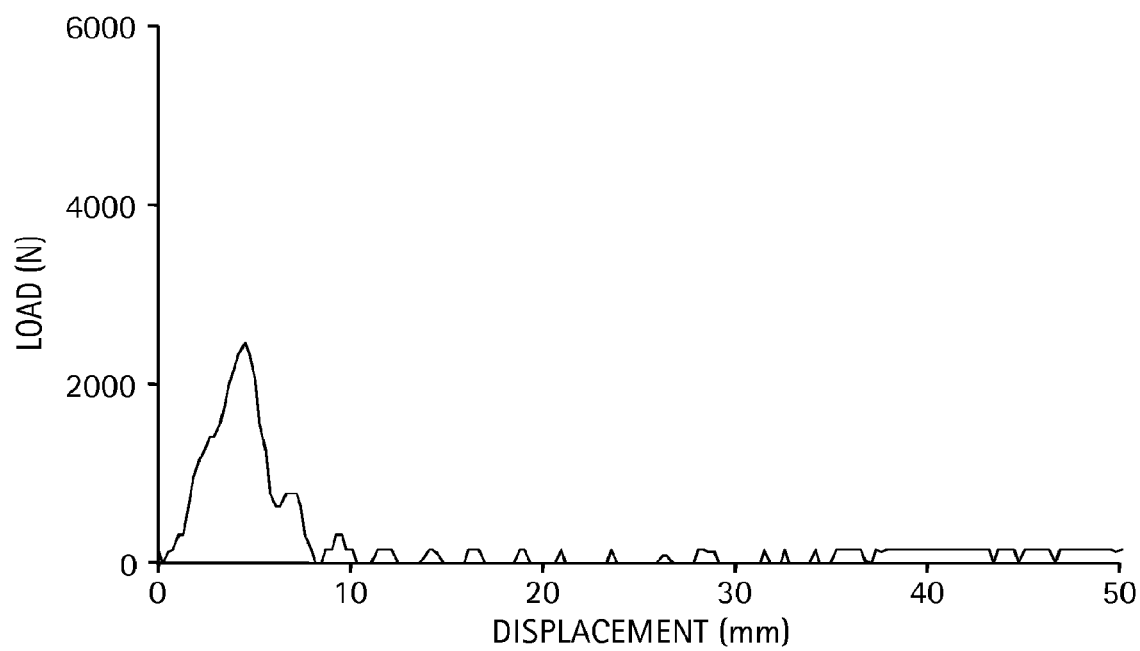
Figure 9C:
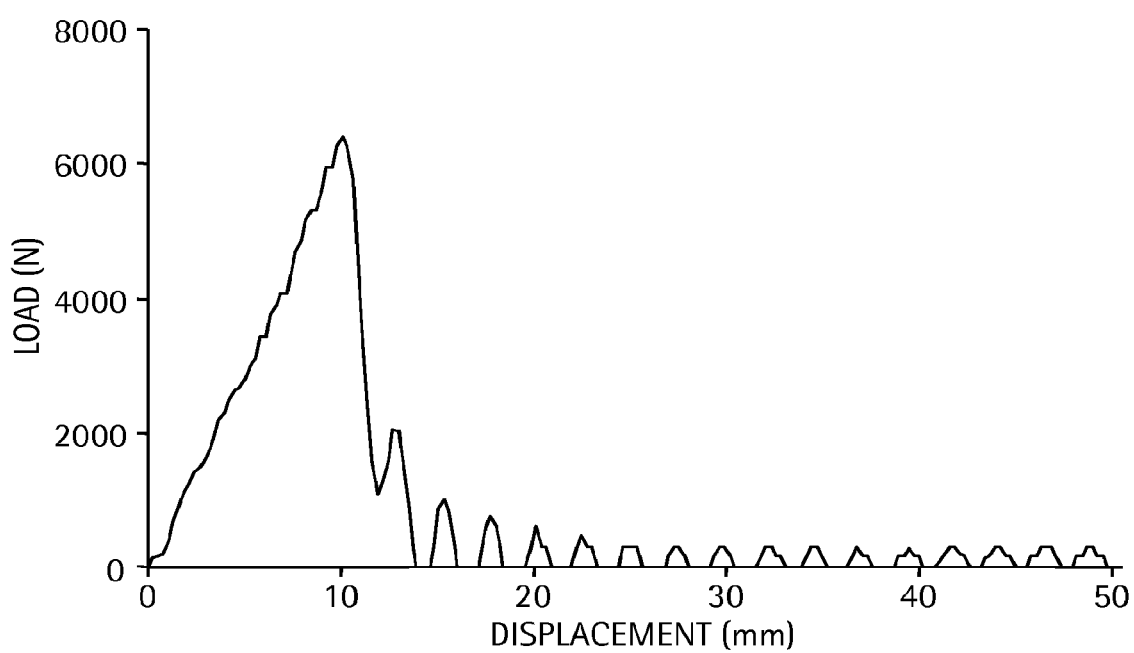

The load displacement curves, at a temperature of −40° C., are presented on FIGS. 9a, 9b and 9c for the 4.5 mm rotomoulded samples prepared respectively with resins R6, R3 and R4.

Resin R6 exhibits a pure ductile behaviour at all tested temperatures, contrary to the other tested resins.

In addition a falling weight impact test was also carried out at a temperature of −20° C. on a 10 liters rotomoulded bottles having a wall thickness of 6 mm and prepared with resin R11. The bottles all had a completely ductile behaviour and the impact results are summarised in Table VI.

TABLE VI

| Total Energy J | Speed m/s | Maximum Energy J |
|---|---|---|
| 107.03 | 3.34 | 66.2 |
| 126.03 | 3.09 | 68.44 |
| 72.15 | 3.73 | 37.44 |
| 119.97 | 3.17 | 81.02 |
| 94.76 | 3.48 | 61.65 |

All the articles prepared according to the present invention also had outstanding optical properties.

In conclusion, for all the tests performed, the polyethylene resin according to the present invention proved at least as good as and in most instances far better than all the prior art resins.

The same conclusions apply to articles prepared using other methods than rotomoulding such as for examples extrusion, injection moulding, slush moulding or thermoforming.

The invention claimed is:
1. A rotomolded article comprising:
a polyethylene having a spherulite size of less than 20 µm, a density ranging from 0.930 to 0.965 g/cc determined in accordance with ASTM 1505 at a temperature of 23° C., a melt index of at least 3 determined in accordance with ASTM D 1238 under a load of 2.16 kg and at a temperature of 190° C., a polydispersity index of lower than 3, and a long chain branching index (LCBI) that is greater than 0, wherein the polyethylene is capable of auto-nucleation, and wherein the polyethylene is prepared under polymerisation conditions at a temperature of less than 90° C. in the presence of a catalyst system comprising an activating agent and a metallocene catalyst component of general formula:

$$R''(Ind)_2MQ_2$$

wherein (Ind) is an indenyl or an hydrogenated indenyl, substituted or unsubstituted; R" is a structural bridge between the two indenyls that comprises a $C_1$-$C_4$ alkylene radical, dialkyl germanium, silicon, siloxane, phosphine or amine radical; which bridge is substituted or unsubstituted; Q is a hydrocarbyl radical having from 1 to 20 carbon atoms or a halogen; and M is a transition metal Group 4 of the Periodic Table or Vanadium;
wherein the polymerisation conditions include ethylene monomer at a concentration of at least 6.5 weight percent, and no hydrogen; and
wherein the rotomoulded article exhibits a permeability of less than 0.5 g/day, wherein the permeability is determined by filling a 10 liter rotomoulded bottle having a wall thickness of 6 mm with fuel at a temperature of 40° C., wherein the fuel is a fuel as defined by CEC RF08-A-85 according to norm Standard ECE34—annex 5.

2. The rotomolded article of claim 1, wherein the polyethylene is prepared under polymerization conditions including a temperature of less than 88° C., no hydrogen, and an ethylene concentration of at least 7 weight percent.

3. A rotomolded article comprising:
a polyethylene having a spherulite size of less than 18 µm, a density ranging from 0.930 to 0.965 g/cc determined in accordance with ASTM 1505 at a temperature of 23° C., a melt index of at least 3 determined in accordance with ASTM D 1238 under a load of 2.16 kg and at a temperature of 190° C., a polydispersity index of lower than 3, and a long chain branching index (LCBI) that is greater than 0, wherein the polyethylene is capable of auto-nucleation;
wherein the polyethylene is prepared by injecting into a reactor a catalyst system, injecting into the reactor ethylene monomer at a concentration of at least 7.0 weight percent, maintaining the reactor under polymerisation conditions including a temperature 80 to 85° C. and no hydrogen; and retrieving the polyethylene;
wherein the catalyst system comprises an activating agent and a metallocene catalyst component of general formula:

$$R''(Ind)_2MQ_2$$

wherein (Ind) is an indenyl or an hydrogenated indenyl, substituted or unsubstituted; R" is a structural bridge between the two indenyls that comprises a $C_1$-$C_4$ alkylene radical, dialkyl germanium, silicon, siloxane, phosphine or amine radical; which bridge is substituted or unsubstituted; Q is a hydrocarbyl radical having from 1 to 20 carbon atoms or a halogen; and M is a transition metal Group 4 of the Periodic Table or Vanadium;

wherein the rotomoulded article exhibits a permeability of less than 0.5 g/day, wherein the permeability is determined by filling a 10 liter rotomoulded bottle having a wall thickness of 6 mm with fuel at a temperature of 40° C., wherein the fuel is a fuel as defined by CEC RF08-A-85 according to norm Standard ECE34—annex 5.

4. A rotomolded article comprising:
a polyethylene having a spherulite size of less than 20 μm, a density ranging from 0.930 to 0.965 g/cc determined in accordance with ASTM 1505 at a temperature of 23° C., a melt index of at least 3 determined in accordance with ASTM D 1238 under a load of 2.16 kg and at a temperature of 190° C., a polydispersity index of lower than 3, and a long chain branching index (LCBI) that is greater than 0, wherein the polyethylene is capable of auto-nucleation, and wherein the polyethylene is prepared under polymerisation conditions at a temperature of less than 90° C. in the presence of a catalyst system comprising an activating agent and a metallocene catalyst component of general formula:

$$R''(Ind)_2MQ_2$$

wherein (Ind) is an indenyl or an hydrogenated indenyl, substituted or unsubstituted; R" is a structural bridge between the two indenyls that comprises a $C_1$-$C_4$ alkylene radical, dialkyl germanium, silicon, siloxane, phosphine or amine radical; which bridge is substituted or unsubstituted; Q is a hydrocarbyl radical having from 1 to 20 carbon atoms or a halogen; and M is a transition metal Group 4 of the Periodic Table or Vanadium;

wherein the polymerisation conditions include ethylene monomer at a concentration of at least 6.5 weight percent and an $H_2/C_2$ ratio of less than 85 g/$10^6$ g; and wherein the rotomoulded article exhibits a permeability of less than 0.5 g/day, wherein the permeability is determined by filling a 10 liter rotomoulded bottle having a wall thickness of 6 mm with fuel at a temperature of 40° C., wherein the fuel is a fuel as defined by CEC RF08-A-85 according to norm Standard ECE34—annex 5.

* * * * *